(12) United States Patent
Ozgokmen et al.

(10) Patent No.: US 10,444,403 B2
(45) Date of Patent: Oct. 15, 2019

(54) BIODEGRADABLE OCEANIC DRIFTER TRACKING DEVICE

(71) Applicant: UNIVERSITY OF MIAMI, Miami, FL (US)

(72) Inventors: Tamay Ozgokmen, Miami, FL (US); Charles Cousin, La Jolla, CA (US); Guillaume Novelli, Miami, FL (US); Cedric Guigand, Miami, FL (US)

(73) Assignee: UNIVERSITY OF MIAMI, Miami, FL (US)

( * ) Notice: Subject to any disclaimer, the term of this patent is extended or adjusted under 35 U.S.C. 154(b) by 0 days.

(21) Appl. No.: 15/664,948

(22) Filed: Jul. 31, 2017

(65) Prior Publication Data

US 2018/0031733 A1 Feb. 1, 2018

Related U.S. Application Data (60) Provisional application No. 62/369,593, filed on Aug. 1, 2016.

(51) Int. Cl.
*G01V 11/00* (2006.01)
*G01S 19/14* (2010.01)

(52) U.S. Cl.
CPC ............ *G01V 11/002* (2013.01); *G01S 19/14* (2013.01)

(58) Field of Classification Search
CPC . B63B 22/00; B63B 22/003; B63B 2022/006; B63B 22/24; B63B 38/00; B63B 2201/00; B63B 2201/16; B63B 2211/02; B63B 2213/00; B63B 2213/02; G01V 11/002; G01S 19/14; G01S 19/38–55

USPC ............... 73/170.01, 170.11, 170.16–170.29, 73/170.34, 488, 493, 495, 432.1, 865.5
See application file for complete search history.

(56) References Cited

U.S. PATENT DOCUMENTS

| 5,007,285 | A | 4/1991 | Dahlen et al. | |
|---|---|---|---|---|
| 5,654,692 | A * | 8/1997 | Baxter, Jr. ............... | B63B 22/16 340/539.13 |
| 9,676,455 | B2 | 6/2017 | MacCready et al. | |
| 9,709,396 | B2 | 7/2017 | Chedrawy et al. | |
| 2004/0185727 | A1 * | 9/2004 | Wada .................... | B63B 22/003 441/6 |

(Continued)

FOREIGN PATENT DOCUMENTS

WO    WO-2013/073950 A1    5/2013

*Primary Examiner* — Robert R Raevis
(74) *Attorney, Agent, or Firm* — Marshall, Gerstein & Borun LLP (57) ABSTRACT

A water body drifter device for tracking movement of a fluid is disclosed. The drifter may include a floater assembly having a toroid shaped buoy fixedly connected to a floater head disposed interiorly to the toroid shaped buoy, the floater head having a recess and a cap sealably attached to the recess for housing a network-enabled controller. The drifter may also include one or more sensors mounted to the floater assembly to capture physical, chemical or biological data from the water body and/or from the environment around the water body, a drogue formed of a plurality of blades each spaced from one another, and a flexible connector attached to the floater assembly at one end and the drogue at another end. The floater assembly, the drogue, and the flexible connector may each be formed of one or more biodegradable materials.

17 Claims, 7 Drawing Sheets

(56) References Cited

U.S. PATENT DOCUMENTS

2015/0185007 A1\* 7/2015 Deshetler Brinton ........................ G01C 13/002
    702/2
2017/0225750 A1\* 8/2017 Dagher ................... B63B 22/18

\* cited by examiner

BIODEGRADABLE OCEANIC DRIFTER TRACKING DEVICE

CROSS REFERENCE TO RELATED APPLICATIONS

This application claims priority to Provisional Application No. 62/369,593, entitled "Biodegradable Oceanic Drifter Tracking Device," filed Aug. 1, 2016, which is incorporated herein by reference in its entirety.

TECHNICAL FIELD

The present disclosure relates to drogue water tracking devices and, more particularly, to biodegradable drogue water tracking devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Understanding the dynamics of oceans is increasingly important for environmental as well as commercial purposes. The dynamics of ocean currents, for example, can tell researchers valuable information about the affects of changing weather patterns. This is particularly true with regard to changes in ocean currents. As global climate change begins to materialize, the affects of ocean current and water movement have become bellwethers for researchers, environmentalists, policy makers, and the like. Indeed, the effects of climate change have been most notable, not in increases in atmospheric temperature, but rather in alarming increases in ocean temperatures.

Numerous techniques are used to measure ocean dynamics such as current drift. Water drifters have been particularly useful for this purpose. A water drifter is a buoyant floating device, typically, with a visual marker, that allows researchers to track fluid and/or current movements over time. While useful, effective measurement of drift in a large water body such as an ocean requires a very large number of drifters, 1,000 drifters, 10,000 drifters, or more. Such large numbers are needed to accurately map the entire water body, or at least the entire expanse of distance over which drift measurements are desired. Typically, water drifters are used, since they naturally map the ocean currents by moving in response to those currents—although some fixed buoy configurations do exist.

Unfortunately, most water drifter devices present a considerable environmental hazard. The typical instruments use plastic components, which can be environmentally digested, but their typical degradation time is approximately 1000 years. Over that time, the plastics break down into small pieces, some of which are consumed by fish, birds, and others living elements, often to their lethal detriment. As a result, when researchers deploy large numbers of water drifters, they do so conceding that a large environmental impact is inevitable, or a lofty expensive effort to recapture as many drifters as practicable must be used. In either case, there is a desire to have better water drifter design, one that is environmentally sound and instrumentally accurate.

SUMMARY

In accordance with an example, a water body drifter device for tracking movement of a fluid is disclosed. The device includes a floater assembly having a toroid shaped buoy fixedly connected to a floater head disposed interiorly to the toroid shaped buoy, wherein the buoy has a buoyancy sufficient to float the device at least partially on the surface of a water body and to return the device to the at least partial float on the surface of the water body if the floater assembly is submerged under the surface of the water body, the floater head having a recess and a cap sealably attached to the recess for housing a network-enabled controller having at least one processor and at least one memory and housing a power source coupled to power the controller, wherein the network-enabled controller is configured to determine and relay position data for the device to an external receiver; one or more sensors mounted to the floater assembly to capture physical, chemical or biological data from the water body and/or from the environment around the water body; a drogue formed of a plurality of blades each spaced from one another, the drogue extending downwardly below the surface of the water body during operation, wherein the blades are sized and weighted to move the device in response to water current or movement of fluid within the water body; and a flexible connector attached to the floater assembly at one end and the drogue at another end, the flexible connector configured to allow translational movement between the floater assembly and the drogue and to allow rotational movement of the drogue and floater assembly relative to the other, wherein the floater assembly, the drogue, and the flexible connector are each formed of one or more biodegradable materials.

In another example, a water body drifter device for tracking movement of a fluid is disclosed. The device includes a floater assembly having toroid shaped buoy fixedly connected to a floater head disposed interiorly to the toroid shaped buoy, wherein the buoy has a buoyancy sufficient to float the device at least partially on the surface of a water body and to return the device to the at least partial float on the surface of the water body if the floater is submerged under the surface of the water body, the floater head having a recess and a cap sealably attached to the recess for housing a network-enabled controller having at least one processor and at least one memory and housing a power source coupled to power the controller, wherein the network-enabled controller is configured to determine and relay position data for the device to an external receiver; one or more sensors mounted to the floater assembly to capture physical, chemical or biological data from the water body and/or from the environment around the water body; and wherein the toroid shaped buoy and floater head are each formed of one or more biodegradable materials.

In yet another example, a method for manufacturing a water body drifter device for tracking movement of a fluid is disclosed. The method includes injecting, via at least one injection molding machine, one or more biodegradable materials into a mold for a toroid shaped buoy; injecting, via the at least one injection molding machine, one or more biodegradable materials into a mold for a floater head having a recess and a cap; injecting, via the at least one injection molding machine, one or more biodegradable materials into a mold for a drogue; and injecting, via the at least one injection molding machine, one or more biodegradable materials into a mold for a flexible connector arm.

BRIEF DESCRIPTION OF THE DRAWINGS

The figures described below depict various aspects of the system and methods disclosed herein. It should be understood that each figure depicts an example of aspects of the present systems and methods.

DETAILED DESCRIPTION

The present disclosure describes electronic water drifter instruments that may be used in large water body environments (e.g., lakes, seas, and oceans) to measure water flow patterns, temperature, surface fluid composition, viscosity, density, and other parameters. In application, these drifter instruments may be used in large numbers (e.g., 1000 drifters, 10,000 drifters, or more) to provide measurement and mapping of drift-dependent parameters.

Figure 1A:
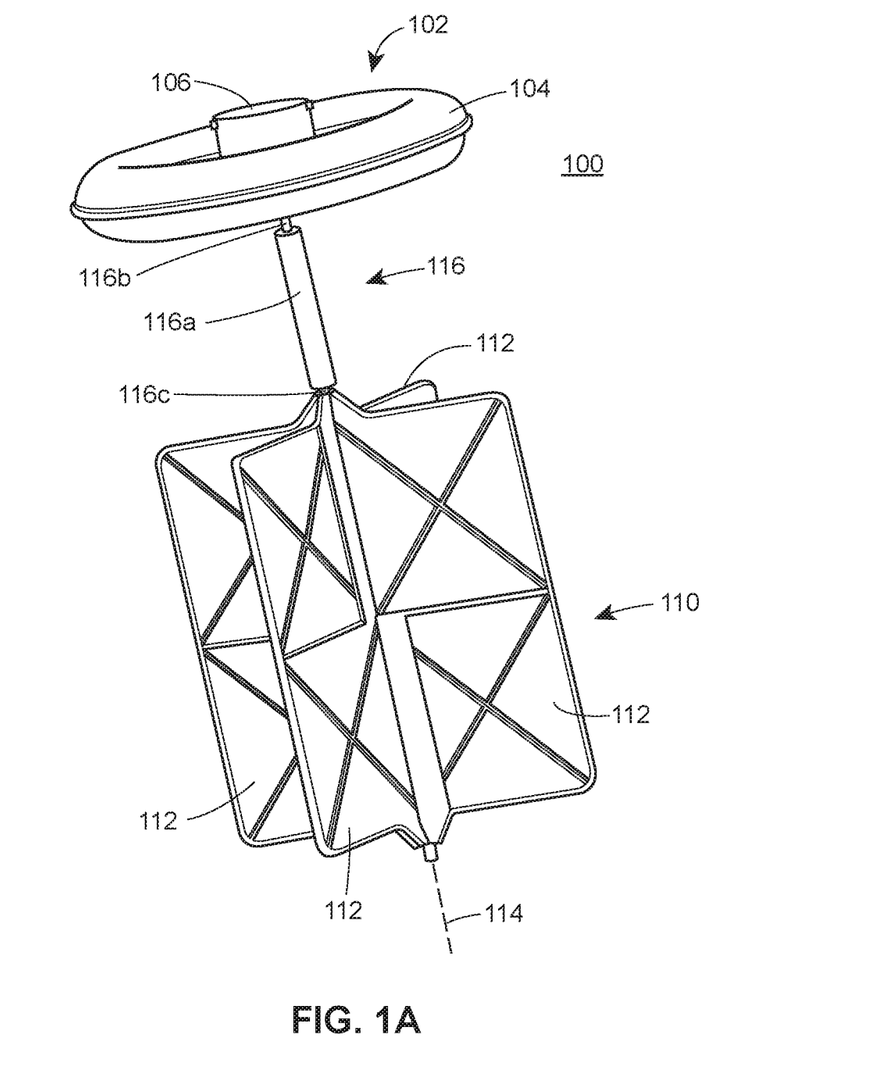
FIGS. 1A-1C illustrate different perspective views of a water drifter tracking device in accordance with an example.
Figures 1B, 1C:
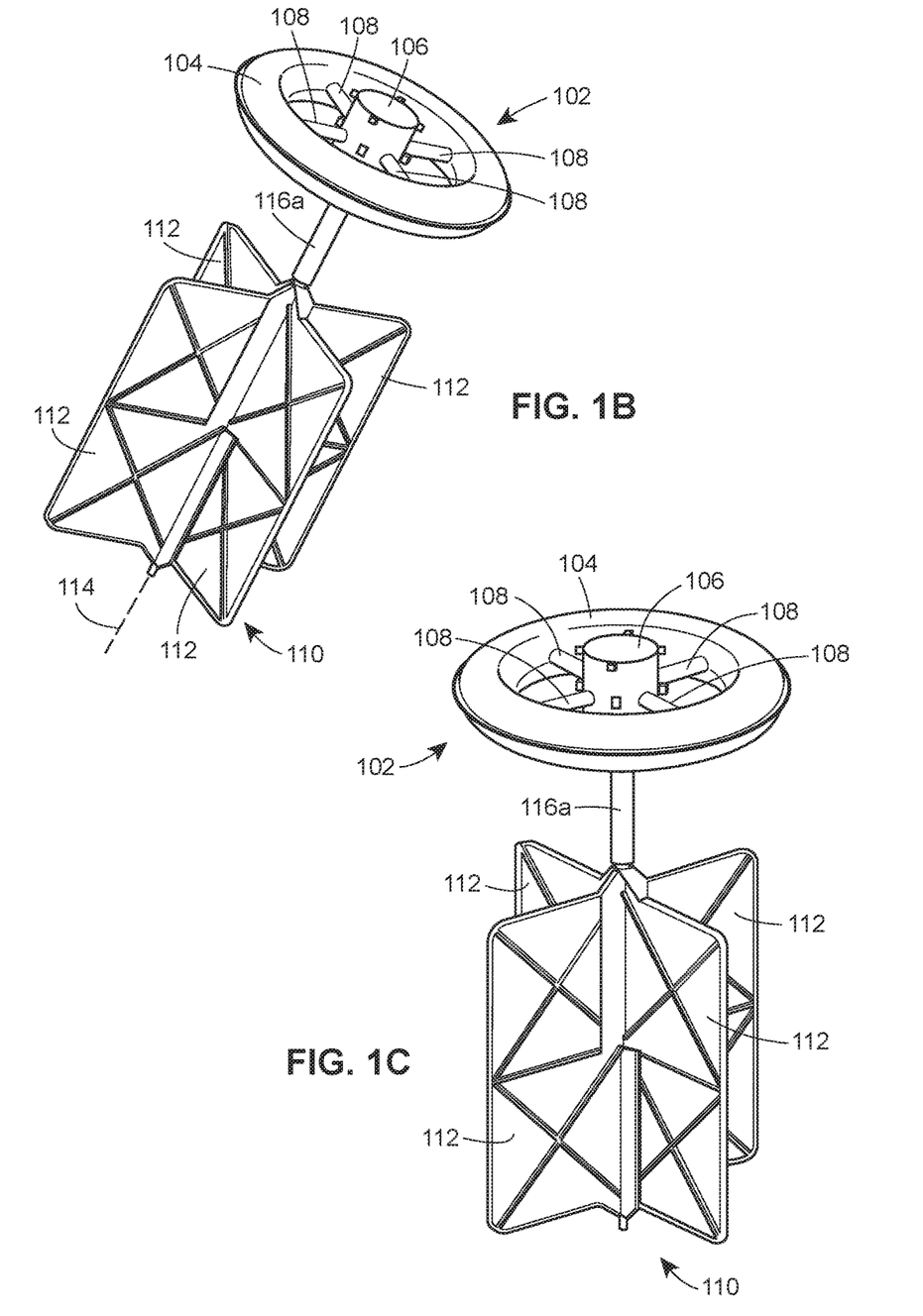

FIGS. 1A-1C illustrate a water drifter tracking device 100 in accordance with an example embodiment. The drifter device 100 includes four main parts. A floater 102, or floater assembly, provides buoyancy to the device 100 and is configured to primarily reside on a water surface of a water body. The floater 102 rests on that water surface either fully or partially where the floater 102 is configured to extend at least partially under the water surface depending on a load.

In the illustrated example, the floater 102 has a toroidal buoy portion 104 shaped like a torus. The toroidal buoy 104 is connected to a head 106, or floater head, through a series of rigid connector arms 108. In this example, there are 4 such connector arms 108. The number of connector arms 108 may be vary depending on a number of factors, including the dimensional size of the toroidal buoy 104, the weight of the materials used for the buoy 104, and the relative weight differences between the buoy 104 and the head 106 and other parts of the drifter device 100. The connector arms 108 and the buoy 104 may be formed of a same material, in particular a biodegradable material, such as a biodegradable plastic, such as Minel P1004 and P1003, available from Metabolix Bioplastics of Cambridge, Mass. This plastic is formed of a corn-based product.

The drifter parts may be formed using injection molding techniques. Hot plate welding may be used to fuse together various components for final manufacturing. For example, after each part of the water drifter tracking device 100 is manufactured via an injection molding technique, hot plate welding may be used to weld the floater assembly 102 to the connector arms 108, the floater assembly 102 to the flexible connector arm 116, and the flexible connector arm 116 to the drogue 110. Each drifter part may be manufactured using an injection molding technique that is custom built for that particular drifter part. Similarly, each drifter part may be welded to the necessary part via a custom hot plate welding machine.

The connector arms 108 may be rigid members rigidly connected to the buoy 104 and the head 106. While, in other examples, the arms 108 may be rigid members flexibly connected to one or both of the buoy 104 and the head 106. In yet other examples, the arms 108 are flexible members connected to each of the buoy 104 and the head 106 such that the arms are able to move relative to these two structures. Other configurations and combinations will be apparent to persons skilled in the art.

The drifter 100 further includes a drogue 110 formed of a series of four (4) blades 112 evenly spaced at orthogonal positions relative to one another around a central axis 114. The blades 112 extend vertically a distance large enough to allow sufficient stability of the drifter device 104, to prevent the device from turning in place while deployed. Instead, the blade size (for both the vertical extent along the axis 114 and the transverse extent radially outward from the axis 114) are chosen to allow the device to maintain rotational stability while still allowing the device 100 to move with water currents for tracking measurements.

The drogue 110 is connected to the head 106 through a vertically-extending flexible connector arm 116 having a flexible portion 116a and two connector ends 116b and 116c for connecting to the head 106 and the drogue 110, respectively. The flexible connector arm 116 may be formed of a natural rubber.

The drifter devices 100 may be deployed in large numbers in a water body, such as a lake, a sea, or an ocean. The head assemblies 106, as discussed further below, contain computer processing devices and sensors for measuring various characteristics of the body of water, e.g., temperature, fluid composition, fluid viscosity, fluid density, and other measures.

The drifter devices 100 may be enabled for wireless network communications, with a centralized communication node, such as one or more base stations or through a satellite communication links. In some examples, the drifter devices 100 are capable of wireless communications between devices, e.g., in a mesh network configuration. For example, a Trace GPS processor available from Globals of Covington, La. The data may be privatized or the data may be protected by pushing the data through a dedicated server. Each device 100 may be configured for wireless communication across any suitable wireless communication protocol, such as, satellite, WiFi, NFC, iBeacon, Bluetooth, Bluetooth Low Energy, X-Bee, ZigBee, Radio Frequency, infrared, Wireless USB, or other suitable protocols.

Thus in some examples, the drifter devices 100 are enabled for inter-device communication as well as communication to a centralized node or base station. This always devices to communication with one another to exchange data, to coordinate data collection, to share global positioning system (GPS) data to coordinate sensor operation, to allow for devices to inherit control data from other devices, to allow for master/servant device designations where certain devices are designed for communication with a centralized system such as a base station while other devices are designated for remote access only, to allow for remotely located devices to still store data on a centralized server through mesh network communications of data, and other features. One or more of the drifter devices 100 may be configured for cloud-based communication and storage of measurement data, position data, etc.

The drifter devices 100, therefore, may include a drogue, floater torus and connector pieces where all the pieces are made from biodegradable materials, in particular materials selected to dissolve in a matter of months not years. Tests, for example, show that drifters can be manufactured that dissolve, safely in approximately 4 months. Various biodegradable materials may be used, of course, to achieve any desired full dissolve timeframe, e.g., greater than 1 year, less than 1 year, less than 6 months, less than 1 month etc.

The drifter devices 100 may be configured in compact, easy to transport and assemble designs, which allows them to be used in large numbers (>1000). A typical deployment of such instruments during a single measure is on the order of 10 instruments (usually a few).

While various modifications may be made to the design, the configurations discussed herein have shown particular effectiveness in almost entirely filtering the effect of waves and winds, thereby allowing the design to measure mostly near-surface ocean currents (e.g., currents or drifts extending from no more than about 0.5 m below the water surface). With this narrowed depth range, measurements of fluids on top of water (such as oil slicks) may be assessed separately from deep ocean water currents and surface waves and wind.

The present techniques are able to measure ocean currents in the upper 0.5 m of the ocean. For conventional drifter designs, this specific region is particularly difficult to isolate, because of the mixture of winds, waves and currents near the surface of the ocean. Most other designs either use a deep drogue to get away from waves and winds and measure deep currents (e.g., 15 m), or measure some unknown combination of winds, waves and currents, which makes it virtually impossible to retrieve useful information about near-surface currents. However, knowledge on near surface currents is critical for oil spill and other applications. The drifter devices herein may be deployed for any number of applications, including measuring and tracking oil spills, ship navigation, hurricane affects on ocean currents, green energy generation, coastal pollutant pathways, and studies on climate change.

Figure 2A:
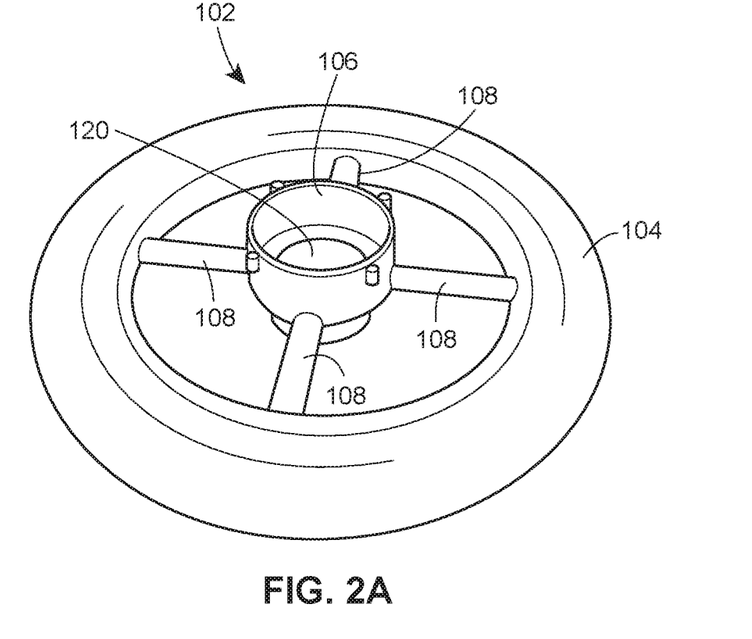
FIGS. 2A and 2B illustrate a portion of a floater assembly used in the water drifter device of FIGS. 1A-1C, in accordance with an example.
Figure 2B:
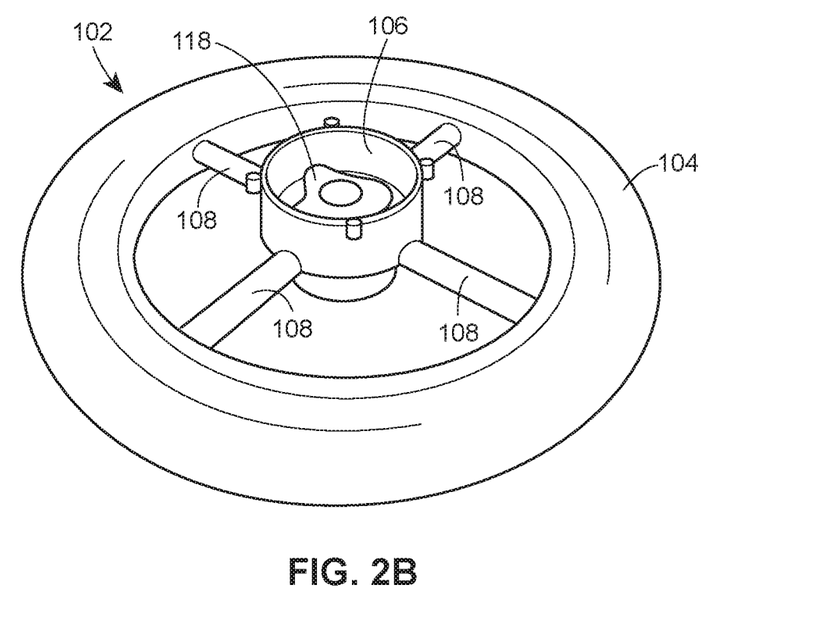

FIGS. 2A and 2B depict a portion of the head 106, which serves as a housing for a battery 118 housed in a recess 120 of the head 106. The battery may be three (3) D-type batteries. In some examples, the battery 118 may be a rechargeable power source, for example, where a cap for the head 106 comprises a solar panel connected to a power converter coupled to charge the battery. In other examples, the drogue 110 may operate as a power converter, converting wave motion into mechanical power that is then converted into electrical power using a power converter within the head 106 and configured to charge the battery.

Figure 3:
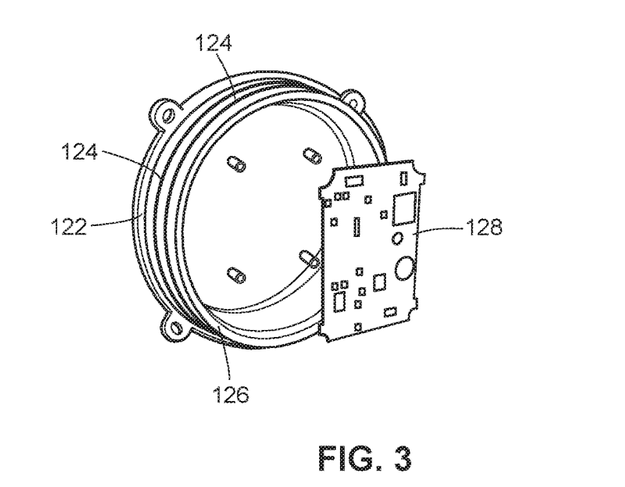
FIG. 3 illustrates a cap assembly for the floater assembly of FIGS. 2A and 2B, in accordance with an example.
Figure 4:
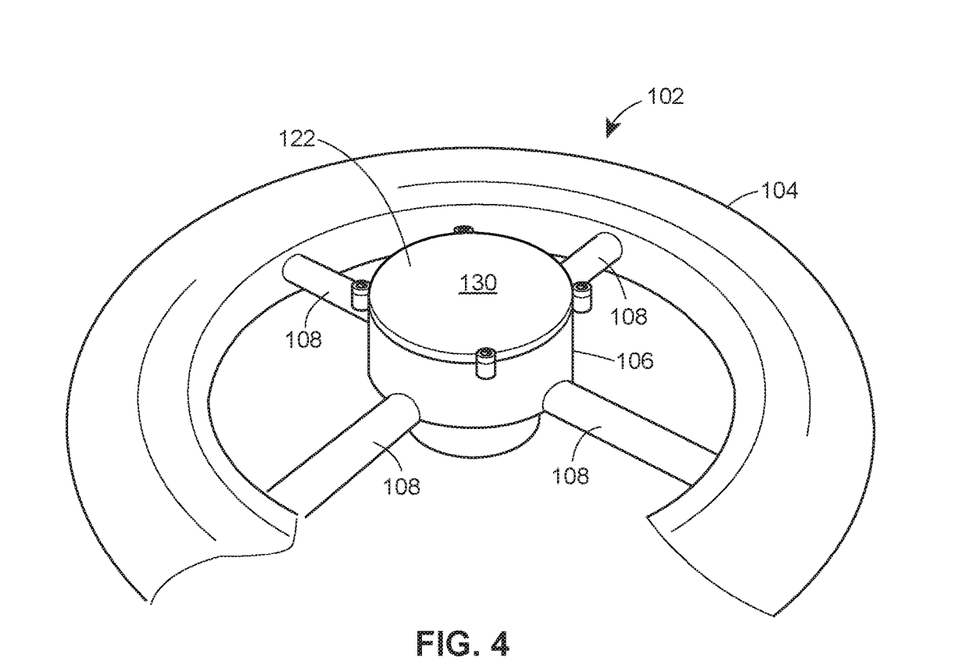
FIG. 4 illustrates the floater assembly with the cap assembly, in accordance with an example.

FIG. 3 illustrates a cap assembly (or casing) 122 for the head 106. The cap assembly 122 includes one or more seal rings 124 (e.g., rubber O-rings) surrounding a cylindrical casing wall 126 and are positioned to provide additional water tight sealing for the head 106, protecting a controller 128 within the head 106 from water damage during operation of the drifter device 100. The casing wall 126 surrounds a recess that includes four mounts that allow for screw-mounting the controller 128 inside the recess and so that the controller 128 may be connected to the battery. FIG. 4 illustrates the cap assembly 122 positioned in place in the head 106. While not shown, an upper surface 130 of the cap assembly 122 may be formed with a solar panel electronically connected to the controller 128, which may include a power converter coupled to charge the battery.

Figure 5:
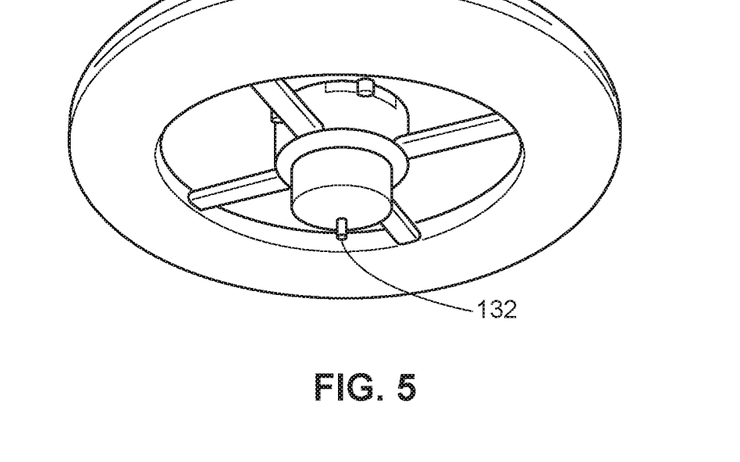
FIG. 5 illustrates an undersurface of the floater assembly showing a connector for attaching a drogue, in accordance with an example.
Figure 6:
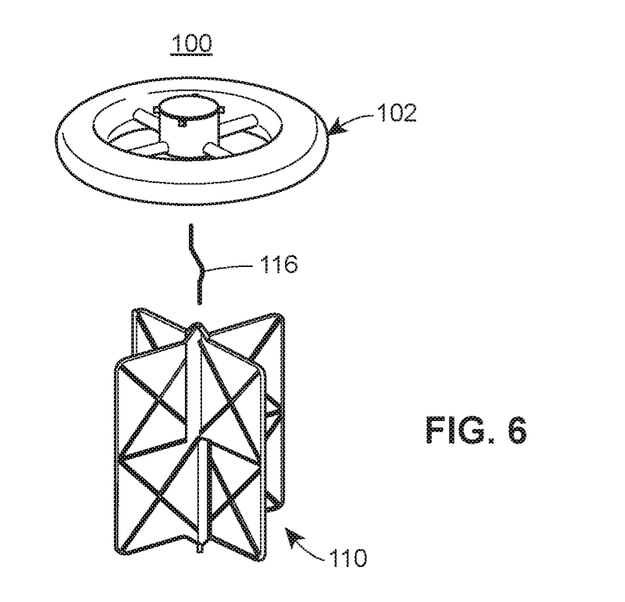
FIG. 6 illustrates a drifter device showing a floater, flexible connector and drogue unassembled, in accordance with an example.
Figure 7:
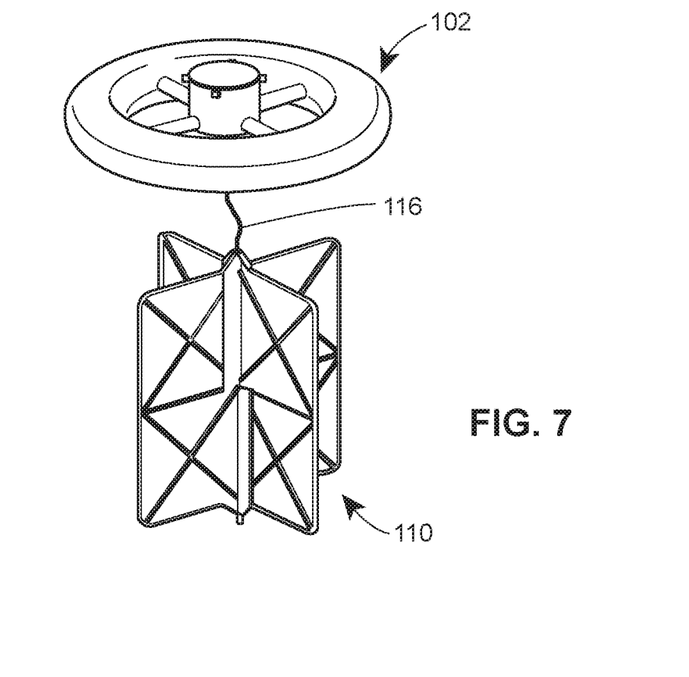
FIG. 7 illustrates the drifter device of FIG. 6 showing the floater, flexible connector, and drogue assembled, in accordance with an example.

FIG. 5 illustrates an under surface of the floater 102 showing a connector 132 on the head 106 for engaging the flexible connector arm 116. The connector 132 may be, for example, a screw connector. FIG. 6 illustrates the drifter device 100 prior to full assembly, and FIG. 7 illustrates the drifter device 100 after assembly.

Figure 8:
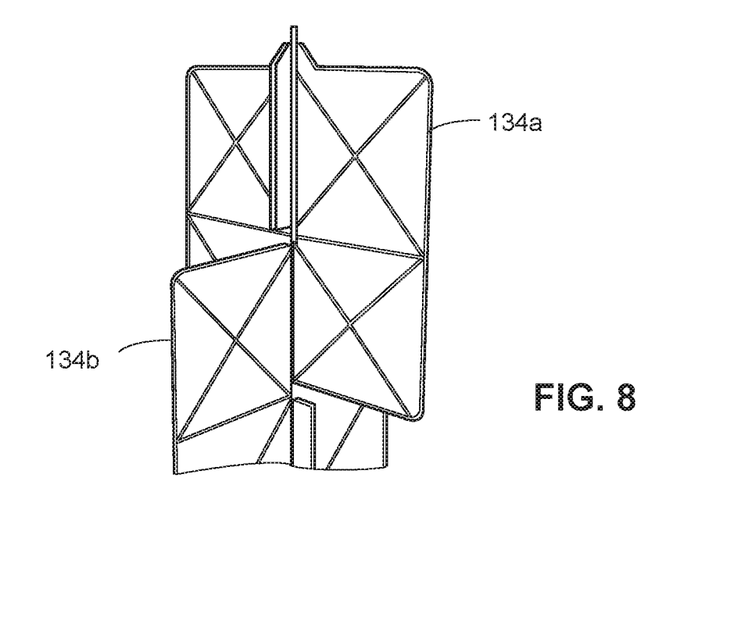
FIG. 8 illustrates the drogue of FIGS. 7 and 6 prior to assembly and formed of two slidably-engaged, blade plates.

FIG. 8 illustrates an example configuration for forming the drogue 110, by using two half-slotted plates 134a and 134b that are slidably engaged into one another to form the four blades 112, each blade positioned at a right angle to each other blade and each blade 112 fixed relative to each other blade. The plates may be formed of a biodegradable plastic similar to, or the same as, that discussed for the floater. The flexible connector may be formed of a natural rubber that is flexible throughout its length.

The controller 128 may be a wireless network enabled controller, such as a GPS capable controller.

Figure 9:
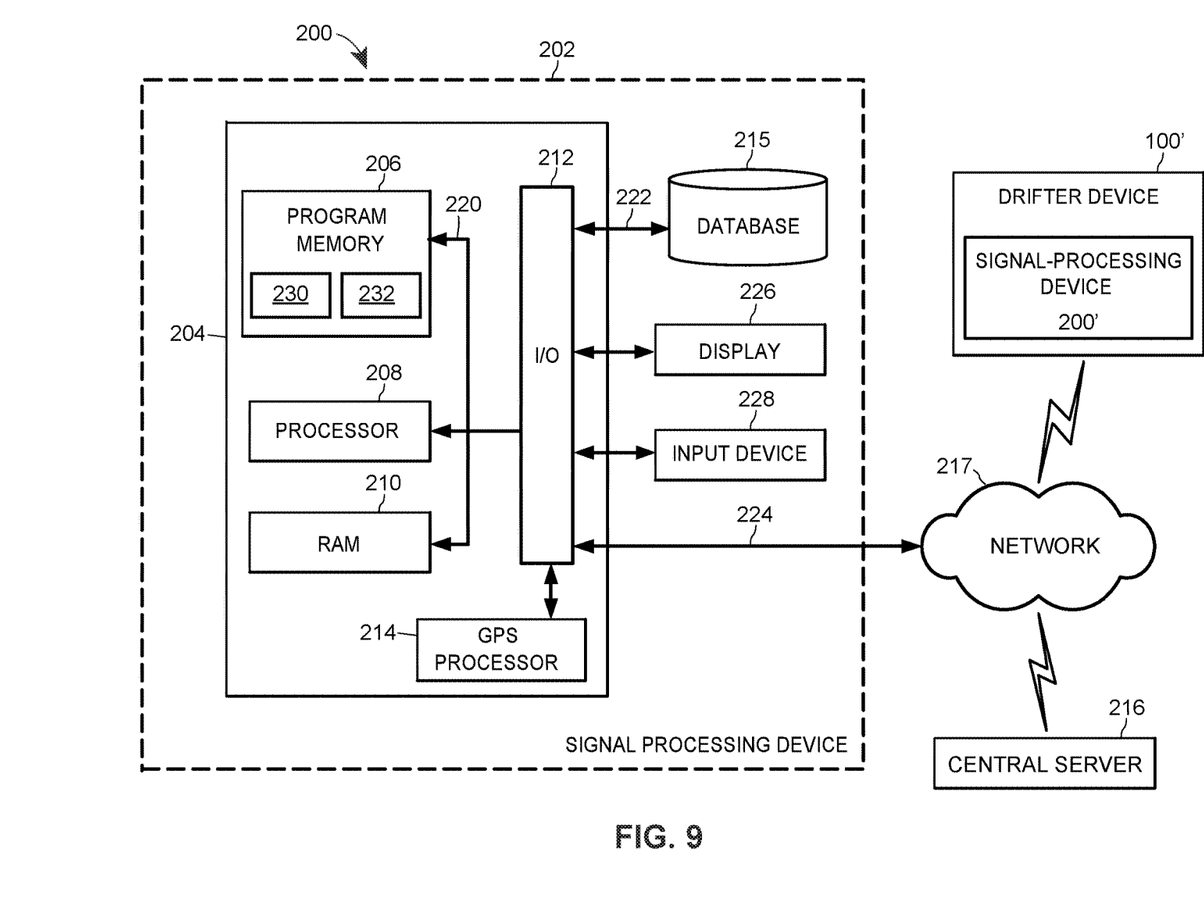
FIG. 9 illustrates a computer processing system as may be employed in a water drifter tracking device, in accordance with an example.

FIG. 9 illustrates an example block diagram 200 that illustrates various components of a drifter device controller, such as maybe be used for position measurements and, in some examples, used as the controller 128 depicted in FIG. 3. A signal-processing device 202 (or "signal processor") is configured with a positioning microprocessor, in this example a global positioning system (GPS) transceiver 214 within the signal processing device 202, which is itself connected to a central server 216 through a network 217, such as a satellite communication network or other wireless network.

The signal-processing device 202 may have a position controller 204 that is coupled to a database 215 through a link 222 connected to an input/output (I/O) circuit 212. That database 215 may store historical position data, collected sensor data, and data from other drifter devices, among other possible information.

The position controller 204 includes a program memory 206, one or more processors 208, and GPS processors 214 (may be called microcontrollers or microprocessors), a random-access memory (RAM) 210, and the input/output (I/O) circuit 212, all of which are interconnected via an address/data bus 220. Although the I/O circuit 212 is shown as a single block, it should be appreciated that the I/O circuit 212 may include a number of different types of I/O circuits. The RAM(s) 210 and the program memories 206 may be implemented as semiconductor memories, magnetically readable memories, and/or optically readable memories, for example. A link 224, which may include one or more wired and/or wireless (Bluetooth, WLAN, etc.) connections, may operatively connect the network 217 through the I/O circuit 212, which may have a GPS antenna in some examples.

The program memory 206 and/or the RAM 210 may store various applications (i.e., machine readable instructions) for execution by the processors 208 and/or 214. For example, an operating system 230 may generally control the operation of the signal-processing device 202 and provide a user interface to the signal-processing device 202 to implement data processing operations. The program memory 206 and/or the RAM 210 may also store a variety of subroutines 232 for accessing specific functions of the signal-processing device 202. By way of example, and without limitation, the subroutines 232 may include, among other things: a subroutine to determine position of the drifter device in accordance with the GPS processor 214; a subroutine to control a sensor on the drifter device and; a subroutine to control storage of position data and/or sensor data on the drifter device; a subroutine to control communication with nearby drifter devices, for example in a mesh network communication configuration.

The subroutines 232 may also include other subroutines, for example, implementing software keyboard functionality, interfacing with other hardware in the signal processing device 202, etc. The program memory 206 and/or the RAM 210 may further store data related to the configuration and/or operation of the signal-processing device 202, and/or related to the operation of the one or more subroutines 232. The signal-processing device 202 may also include various types of input/output hardware such as a visual display 226 and input device(s) 228 (e.g., keypad, keyboard, etc.). In an embodiment, the display 226 is touch-sensitive, and may cooperate with a software keyboard routine as one of the software routines 232 to accept user input.

In some examples, one or more of the functions of the system 200 may be performed remotely, including, for example, on the server 216, through a wired or wireless interface at 212 and the network 217. Such distributed processing may include having all or a portion of the processing of system 200 performed on the central server 216. In some embodiments another drifter device 100' may have a system 200' like that of system 200 and communicate with the drifter device of the system 200 through the network 217.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines, such as a number of different drifter devices or other remote machines.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A water body drifter device for tracking movement of a fluid, the device comprising:
    a floater assembly having a toroid shaped buoy fixedly connected to a floater head disposed interiorly to the toroid shaped buoy, wherein the buoy has a buoyancy sufficient to float the device at least partially on the surface of a water body and to return the device to the at least partial float on the surface of the water body if the floater assembly is submerged under the surface of the water body, the floater head having a recess and a cap sealably attached to the recess for housing a network-enabled controller having at least one processor and at least one memory and housing a power source coupled to power the controller, wherein the network-enabled controller is configured to determine and relay position data for the device to an external receiver;
    one or more sensors mounted to the floater assembly to capture physical, chemical or biological data from the water body and/or from the environment around the water body;
    a drogue formed of a plurality of blades each spaced from one another, the drogue configured to extend downwardly below the surface of the water body during operation, wherein the blades are sized and weighted to move the device in response to water current or movement of fluid within the water body; and
    a flexible connector attached to the floater assembly at one end and the drogue at another end, the flexible connector configured to allow translational movement between the floater assembly and the drogue and to allow rotational movement of the drogue and floater assembly relative to the other,
    wherein the floater assembly, the drogue, and the flexible connector are each formed of one or more biodegradable materials.

2. The device of claim 1, wherein the floater assembly is a low profile device shaped such that movement of the device is unaffected by wind currents over the water body.

3. The device of claim 2, wherein the floater assembly comprises a cut-out positioned to pass wind through the cut-out.

4. The device of claim 1, wherein the drogue is a rotatable drogue to minimize wave rectification from the water body.

5. The device of claim 1, where each of the blades of the drogue is equally spaced from each adjacent blade, and wherein the blades are configured such that, in rotation, the drogue defines a cylindrical shape.

6. The device of claim 1, where each of the blades of the drogue is equally spaced from each adjacent blade, and wherein the blades are configured such that, in stasis, the blades define a cross shape.

7. The device of claim 1, wherein the flexible connector is a pliable linking arm.

8. The device of claim 1, wherein the toroid shaped buoy and floater head, the drogue, and the flexible connector are each formed of one or more natural organic materials, one or more environmentally safe metals, or a combination of both.

9. A water body drifter device for tracking movement of a fluid, the device comprising:
    a floater assembly having toroid shaped buoy fixedly connected to a floater head disposed interiorly to the toroid shaped buoy, wherein the buoy has a buoyancy sufficient to float the device at least partially on the surface of a water body and to return the device to the at least partial float on the surface of the water body if the floater is submerged under the surface of the water body, the floater head having a recess and a cap sealably attached to the recess for housing a network-enabled controller having at least one processor and at least one memory and housing a power source coupled to power the controller, wherein the network-enabled controller is configured to determine and relay position data for the device to an external receiver;

one or more sensors mounted to the floater assembly to capture physical, chemical or biological data from the water body and/or from the environment around the water body; and wherein the toroid shaped buoy and floater head are each formed of one or more biodegradable materials.

10. The device of claim 9, wherein the floater assembly is a low profile device shaped such that movement of the device is unaffected by wind currents over the water body.

11. The device of claim 9, wherein the floater assembly comprises a cut-out positioned to pass wind through the cut-out.

12. The device of claim 9, wherein the floater assembly has a rotatable drogue to minimize wave rectification from the water body.

13. The device of claim 9, further comprising:

a drogue formed of a plurality of blades each spaced from one another, the drogue extending downwardly below the surface of the water body during operation, wherein the blades are sized and weighted to move the device in in response to water current or movement of fluid within the water body; and a flexible connector attached to the floater assembly at one end and the drogue at another end, the flexible connector configured to allow translational movement between the floater assembly and the drogue, and to allow rotational movement of the drogue and floater assembly relative to the other.

14. The device of claim 13, wherein the drogue is a rotatable drogue to minimize wave rectification from the water body.

15. The device of claim 13, where each of the blades of the drogue is equally spaced from each adjacent blade, and wherein the blades are configured such that, in rotation, the drogue defines a cylindrical shape.

16. The device of claim 13, where each of the blades of the drogue is equally spaced from each adjacent blade, and wherein the blades are configured such that, in stasis, the blades define a cross shape.

17. The device of claim 9, wherein the flexible connector is a pliable linking arm.

* * * * *